UNITED STATES PATENT OFFICE.

JONATHAN BLISS, OF JERSEY CITY, NEW JERSEY, AND FRANKLIN O. BADGER, OF BROOKLYN, ASSIGNORS TO WILFORD L. PALMER, OF NEW YORK, N. Y.

MANUFACTURE OF BUTTONS AND OTHER ARTICLES.

SPECIFICATION forming part of Letters Patent No. 225,556, dated March 16, 1880.

Application filed January 7, 1880.

*To all whom it may concern:*

Be it known that we, JONATHAN BLISS, of Jersey City, in the county of Hudson and State of New Jersey, and FRANKLIN O. BADGER, of Brooklyn, in the county of Kings and State of New York, have invented a new and useful Improvement in the Manufacture of Buttons and other Articles, which improvement is fully set forth in the following specification.

This invention relates to the manufacture of buttons or other articles for use and ornament from a compound of powdered blood and powdered hoof, to which may be added a suitable pigment.

In carrying out our invention we take hoof, and, after having washed and cleansed the same, we reduce it to a coarse powder by saws or any other suitable means. To this coarse powder we add a suitable pigment which is previously moistened with or dissolved in water, so that it will readily adhere to the grains of the powder, and after having dried the colored mass, it is thrown into a mill, together with a suitable proportion of dried blood; and this mixture is then reduced to a fine powder, which is finally introduced into heated dies and subjected to a high pressure.

The proportion in which blood and hoof are mixed together may vary according to the nature of the articles to be produced.

In manufacturing buttons we have obtained good results by using the following proportions: dried blood, from twenty-five to fifty parts, by weight; hoof, from seventy-five to fifty parts, by weight.

We are well aware that buttons and other articles have been manufactured from dried pulverized blood compressed by heated dies, as described in Letters Patent No. 193,846, granted August 7, 1877, to Wilford L. Palmer as our assignee; also, of dried pulverized blood mixed with sawdust and other mineral, animal, or vegetable substances, and compressed in heated dies, as described in the French Patent No. 13,898, granted to Lepage, Fabrich & Co., October 3, 1855, together with three certificates of addition, dated, respectively, March 13, 1857, March 29, 1858, and August 11, 1860; and in the English Patent No. 1,206, granted April 22, 1872, to Thomas James Smith. Also, in the United States Patents No. 192,863, dated July 10, 1877, Reissue No. 8,305, and No. 202,636, dated April 26, 1878, granted to William H. Dibble for the same invention as described in the French and English patents above named. In neither of these patents is hoof mentioned as one of the ingredients to be mixed with blood.

We are further aware that buttons and other articles have been manufactured by compressing pulverized hoof in heated dies, as described in Patent No. 116,213, granted June 20, 1871, to Niles and Pitts, and in Patent No. 166,475, granted August 10, 1875, to William F. Niles; but neither of these patents describes a composition of pulverized blood and hoof.

Buttons or other articles produced by compressing powdered hoof in heated dies are more difficult to polish than those produced from powdered blood, while articles produced by compressing powdered blood in heated dies are much more easily and cheaply polished.

When powdered hoof is mixed with powdered blood, and the mixture is compressed in heated dies, the buttons or other articles produced have a denser and harder body than those produced from blood alone, and consequently they can be easily and cheaply polished by the qualities imparted to the hoof by the blood.

Hoof is in this respect different from horn, that it contains more of a gelatinous substance which holds within itself a certain fiber, so that the powdered hoof, when mixed with powdered blood, readily amalgamates therewith, while horn is too dry to effect satisfactory amalgamation with powdered blood.

We do not claim as our invention, therefore, the process of producing buttons or other articles by compressing powdered blood either alone or mixed with other animal, mineral, or vegetable substances in heated dies.

What we claim as new, and desire to secure by Letters Patent, is—

The novel composition or compound herein described for making buttons or other articles, consisting of powdered blood and hoof, the whole being prepared and combined together, substantially as and for the purpose set forth.

In testimony that we claim the foregoing we have hereunto set our hands and seals this 5th day of January, 1880.

JONATHAN BLISS. [L. S.]
FRANKLIN O. BADGER. [L. S.]

Witnesses:
W. HAUFF,
E. F. KASTENHUBER.